United States Patent [19]

Claesen et al.

[11] Patent Number: 5,182,325
[45] Date of Patent: Jan. 26, 1993

[54] POLYMER CONTAINING FLUORINATED POLYMER AND BORON COMPOUND

[75] Inventors: Christianus A. Claesen, Bergen op Zoom; Johannus H. G. M. Lohmeijer, Hoogerheide; Michael P. J. Boogers, Eindhoven; Jan Bussink, Bergen op Zoom; Hermannus B. Savenije, Putte; Theodorus L. Hoeks, Bergen op Zoom; Johannes C. Gosens, Roosendaal, all of Netherlands

[73] Assignee: General Electric Co., Selkirk, N.Y.

[21] Appl. No.: 420,509

[22] Filed: Oct. 12, 1989

[30] Foreign Application Priority Data

Oct. 12, 1988 [NL] Netherlands ............... 8802502
Nov. 11, 1988 [NL] Netherlands ............... 8802919
Jun. 5, 1989 [NL] Netherlands ............... 8901415

[51] Int. Cl.$^5$ .................... C08K 3/38; C08K 5/55
[52] U.S. Cl. .................... 524/404; 524/405; 524/183
[58] Field of Search ............. 525/146, 144, 189, 150, 525/219, 151; 528/8; 524/183, 405, 404, 415, 436, 165, 184, 185

[56] References Cited

U.S. PATENT DOCUMENTS

| 3,321,435 | 5/1967 | Fritz et al. | 524/183 |
|---|---|---|---|
| 3,453,231 | 7/1969 | Bussink et al. | 524/183 |
| 3,487,454 | 12/1969 | Oates et al. | 525/189 |
| 3,582,518 | 6/1971 | Lyons | 524/405 |
| 3,639,299 | 2/1972 | MacDowell | 260/2.5 |
| 3,816,307 | 6/1974 | Woods | 524/405 |
| 3,884,873 | 5/1975 | Short | 525/189 |
| 3,919,356 | 11/1975 | Boyer | 260/891 |
| 4,101,511 | 7/1978 | Floyd | 524/183 |
| 4,131,711 | 12/1978 | Attwood | 525/150 |
| 4,211,679 | 7/1980 | Mark | 524/183 |
| 4,212,793 | 7/1980 | Shue | 524/405 |
| 4,220,583 | 9/1980 | Mark | 525/151 |
| 4,223,100 | 9/1980 | Reinert | 525/146 |
| 4,252,916 | 2/1981 | Mark | 525/151 |
| 4,332,714 | 6/1982 | Haaf et al. | 525/151 |
| 4,335,038 | 6/1982 | Thomas | 524/404 |
| 4,355,126 | 10/1982 | Haaf | 524/141 |
| 4,366,276 | 12/1982 | Freitag et al. | 525/146 |
| 4,391,935 | 7/1983 | Bialous et al. | 524/165 |
| 4,433,104 | 2/1984 | Giles | 525/180 |
| 4,493,917 | 1/1985 | Bailleux et al. | 525/150 |
| 4,649,168 | 3/1987 | Kress et al. | 524/405 |
| 4,663,391 | 5/1987 | Boutni | 525/146 |
| 4,686,245 | 8/1987 | Nelson | 524/183 |
| 4,687,801 | 8/1987 | Mitani et al. | 524/404 |
| 4,772,655 | 9/1988 | Krishnan . | |
| 4,897,439 | 1/1990 | Rau et al. | 525/151 |

FOREIGN PATENT DOCUMENTS 85834 8/1983 European Pat. Off. .
59-74138A 4/1984 Japan .
1340558 12/1973 United Kingdom .

Primary Examiner—Veronica P. Hoke
Attorney, Agent, or Firm—Joseph T. Eisele; Francis T. Coppa

[57] ABSTRACT

The flame-retardant properties of polymers with an aromatic main chain can be improved by incorporating therein a fluorine compound in combination with a boron compound.

10 Claims, No Drawings

POLYMER CONTAINING FLUORINATED POLYMER AND BORON COMPOUND

BACKGROUND OF THE INVENTION

1. Field of the Invention

The invention relates to a polymer-based material which comprises a flame-retardant and optionally a plasticiser and further conventionally used additives

2. Brief Description of the Prior Art

Polymers having an aromatic main chain are materials having good properties which are used in many fields. They are high-melting-point materials and for facilitating their processing a quantity of plasticiser is sometimes added or they are mixed with styrene polymers. It is sometimes desired to improve the impact strength of this type of polymers and for that purpose a rubber is often added, for example, EPDM-rubber or rubber-modified polystyrene. In addition additives for other purpose are also used, if so needed. However, a flame-retardant is conventionally incorporated in all materials.

Polymers having an aromatic main chain are to be understood to mean herein polymers the main chain of which is formed from units having at least one aromatic ring, also including hetero-aromatic rings, which is incorporated in the main chain of the polymer. Not included are polymers, for example, polystyrene, the aromatic ring of which is incorporated in the side chain of the polymer.

The polymers of the above-mentioned group have in common that their combustibility and smoke production generally are slightly smaller than those of polymers, for example, polystyrene and the polyalkenes. Of course, the various polymers of this group do differ mutually in their combustibility and smoke production.

For various important applications, for example, in aeroplanes, a great fire resistance and low smoke production are required. For purposes having stringent combustibility requirements it is therefore sometimes to be preferred not to mix a polymer having an aromatic main chain with a modifying polymer which increases the combustibility. In that case it is further to be preferred to use a plasticiser of a predominantly aromatic nature, if such a plasticeser is to be used.

Various possibilities are available to make polymeric materials flame-retardant For example, the quantity of polymer in the material may be reduced by the addition of inorganic fillers. However, large quantities of this material are necessary which would deteriorate the physical properties of the polymers having an aromatic chain to an unacceptable extent. Another possibility consists in mixing with materials which split off water or carbon dioxide during burning, but such materials cannot be used in polymers having high processing temperatures in which most polymers having an aromatic chain are included. Compounds which comprise phosphorus, chlorine and/or bromine, sometimes with an antimony compound, are conventionally used as flame-retardants in polymer materials. Such flame-retardants produce their effect by poisoning of the flame. This results in an incomplete combustion of the polymer, which in turn usually causes an increase of the smoke emission. Furthermore, the thermal stability of these agents is also restricted, so that they are not suitable as such in polymers which require a high processing temperature. Fluorine-containing compounds have seldom been used as flame-retardants. They often are too stable and in addition it has been found that fluorine is not so effective as a flame poison in the vapour phase as is the case with chlorine or bromine.

Another, scarcely examined, possibility is to achieve the flame-retarding effect by an increase of the yield of carbonised material (remaining weight after combustion); this also implies that the emission of combustible gases and hence of smoke is reduced.

It has been found surprisingly that combination of fluorine compounds and boron compounds form good flame-retardants for polymers of this class and this not only for polymer materials of this type which are used in stringent combustibility requirements, but also for combinations which have to satisfy less stringent requirements and the polymer component of which comprises at least 20% polymer having an aromatic main chain.

SUMMARY OF THE INVENTION

The invention therefore provides a material of the kind described in the opening paragraph which is characterised in that at least 20% of the polymer component has an aromatic chain and the flame-retardant is a mixture of 0.2–15% by weight of at least one fluorine compound and 0.05–10% by weight of at least one boron compound, related to the polymer component.

DETAILED DESCRIPTION OF THE PREFERRED EMBODIMENTS OF THE INVENTION

Of course, the flame-retardant may not become operative prematurely, i.e. during the processing of the synthetic material. At the beginning of the examination which has led to the present invention this was verified by means of DSC (Differential Scanning Calorimetry) with reference to the combination of polyvinylidene fluoride and various boron compounds. Polyvinylidene fluoride itself decomposes only above 480° C. and the decomposition is endothermal. However, the thermal stability of this polymer is reduced by the addition of boron compounds. By means of DSC (Differential Scanning Calorimetry) this could be observed as a sharply bounded exothermal reaction which, dependent on the nature of the boron compound chosen, occurs at 280° C. to 470° C.

The reaction temperatures determined by DSC of polyvinylidene fluoride (abbreviated as PVDF) with a few boron compounds are recorded hereinafter.

| Combination | Reaction temperature |
| --- | --- |
| PVDF/sodium tetraborate | 290° C. |
| PVDF/zinc borate | 300° C. |
| PVDF/boron oxide | 320° C. |
| PVDF/lithium metaborate | 370° C. |
| PVDF/sodium metaborate | 470° C. |

On the basis of this it is possible to choose a combination which starts to exercise its flame-retarding and smoke-restricting activity at a given desired temperature.

The problem of premature activity of the flame-retardant can easily be avoided, for example, by encapsulating one of the components of the flameretardant or by adding one of the components only towards the end of the processing cycle of the material. In this manner any desired combination of fluorine and boron compound may be used.

As polymers having an aromatic main chain are to be considered in particular polyphenylene ethers, polyphenylene sulphides, polycarbonates, polyether imides, polyether sulphones, polyether-(ether)-ketones, polybenzimidazoles, aromatic polyamides and aromatic LCP's (i.e. aromatic liquid crystalline polymers).

During the development of the present invention polyphenylene ether types and combinations of a few fluoropolymers and a few boron compounds have first been used. Experiments have then been carried out with other polymers having an aromatic main chain and with other fluorine and boron compounds, respectively. In these experiments the general applicabiity of the invention for the indicated field was established.

In case of polyphenylene ethers it is of particular importance to make polyphenylene ether mixtures, without or preferably with a plasticizer, or polyphenylene ether mixtures which comprise only a small quantity of rubber to improve the impact strength, flameretardant. In this manner polymer mixtures are obtained which satisfy stringent fire-safety requirements. The flame-retarding combination according to the invention can also be used successfully with materials comprising, for example, mixtures of polyphenylene ether with highimpact polystyrene or polyoctenylene, combinations which may comprise large or even predominant (up to 80%) quantities of polystyrene or rubber. On the basis of their nature these latter types are much more combustible, but the combustibility thereof is also reduced by the present invention, albeit that herewith not such a large inhibition of the combustibility and smoke production can be achieved as with materials which have to satisfy the stringent combustibility requirements mentioned hereinbefore. In this manner polymer mixtures are obtained which satisfy stringent fire-safety requirements.

This situation applies in general to the polymers having a predominantly aromatic main chain.

As a plasticiser optionally to be used aromatic plasticisers are sometimes to be preferred. For example, polyaromatic esters are to be considered, for example, diphenylphthalate and the like A commercially available plasticiser which has proved to be suitable is pentaerytritol tetrabenzoate (commercial product Benzoflex S552). However, suitable non-aromatic plasticisers may often be used, too.

When polymeric fluorine compounds are used, both an incompletely fluorinated polymer or copolymer, and a completely fluorinated polymer, may be chosen. As not completely fluorinated polymer products may be mentioned polyvinylidene fluoride and copolymers of ethene and tetrafluoroethene, the gross composition of which corresponds approximately to that of polyvinylidene fluoride. A known and suitable completely fluorinated polymer is polytetrafluoroethene. Polyvinyl fluoride also enters into the desired reaction, but does this at a lower temperature, so that in that case the addition of the flame-retardant consisting of two components is never possible as such before or during the processing. However, as already stated hereinbefore, this disadvantage can easily be obviated by encapsulating one of the two components in a material which, in the case of fire, melts easily, or by adding one of the two components only towards the end of the processing. For example, when $B_2O_3$ is used, this may be added separately, either at the output of the extruder, or at the injection moulding apparatus.

As will become apparent from the examples hereinafter, however, non-polymeric fluorine compounds are also suitable, for example, simple or complex inorganic fluorine salts.

As boron compounds are to be considered, for example, boric acid, $B_2O_3$, and borates, but, as will become apparent from the examples, organic boron compounds are also suitable.

The two components of the present flame-retardant below their reaction temperature are stable substances which are not reactive with respect to plasticisers or other additives present in the polymer component.

The quantities of the fluorine compound and the boron compound to be used are always within the above-mentioned ranges but depend for each individual case on the nature of the polymer component, the nature of the fluorine compound chosen and the nature of the selected boron compound. The optimum quantities can always be determined easily by means of simple experiments.

In case of polyphenylene ethers it may be stated in general that in the choice of polyvinylidene fluoride as a fluorine compound quantities of 0.2–3% by weight of boric acid, $B_2O_3$, or borate, related to the polymer component, are suitable. In the case in which polytetrafluoroethene instead of polyvinylidene fluoride is used in this combination, a combination of 3–7% by weight thereof with 1.5–3.5% of $B_2O_3$ or borate is suitably used. In the case of boric acid which can ba much more finely distributed, however, smaller quantities will suffice. In that case 1–2% by weight of polytetrafluoroethene and 1–3% by weight of $H_3BO_3$ are preferably used.

The material of the invention may moreover comprise one or more additives conventionally used for such materials, for example, fillers, reinforcing fibres, stabilisers, pigments and dyes, plasticisers, mould-release agents, agents to improve the notch impact strength value. If it is desired to add further flame retardants, these preferably are not the conventional flame poisons for example, the comparatively small molecular phosphorus compounds. Stable phosphorus containing compounds having a large molecular weight, however, may be used indeed and these compounds simultaneously serve as plasticisers.

In so far as there exists a sufficient difference between the processing temperature of the material and the reaction temperature of the flameretarding combination, the components of the flameretardant used according to the invention may be incorporated in the basic polymer at any desired instant, for example, by simply mixing the materials before the conventional extrusion or optionally during the extrusion, for example, approximately halfway or near the extrusion head. The addition may also be carried out during the final processing, for example, during injectionmoulding or shaping by extrusion. Furthermore, a master batch may be prepared of one of the two components and may be added to the basic mixture. For the choice between the various possibilities one will be led in general by the said difference between the temperature at which the flame-retardant becomes reactive and the processing temperature of the material.

It is to be noted that the use of phosphonic acid salts as flame-retardants has been described in EP-A-0.245.207. These may be salts with a metal or metalloid from the group IIA, IIB, IIIA and VA of the Periodic Table of the Elements. Although this includes a boron compound, boron is not further mentioned; the preferred salts are aluminium salts. Furthermore, again compounds are concerned which produce their flame-retarding activity by flame poisoning. It is further to be noted that Netherlands Patent Application 6603028 discloses a method of making polyurethane materials flame-retarding by means of a combination of polyvinylidene fluoride, antimony oxide and a compound of an element which is capable of causing the dehydrofluorination of polyvinylidene fluoride to occur at a lower temperature than in the absence of the said compound. Boron compounds are mentioned as one of the possibilities, but are not further explained in the examples.

The following examples only serve to further explain the invention and they are not intended to restrict the invention in any respect. A first series of examples was carried out with a poly-(2,6-dimethyl -1,4- phenylene) ether having an intrinsic viscosity of 46 ml/g in chloroform at 25° C.

EXAMPLE 1

| Composition of materials, parts by weight | | | | | | | |
|---|---|---|---|---|---|---|---|
| Polyphenylene ether | 80 | 80 | 80 | 80 | 80 | 80 | 80 |
| Pentaerytritoltetrabenzoate | 20 | 20 | 20 | 20 | 20 | 20 | 20 |
| (Benzoflex S552, plasticiser) | | | | | | | |
| Polyvinylidene fluoride (PVDF) | 0 | 0.5 | 0.25 | 0.5 | 1 | 2 | 1 |
| Boron oxide | 0 | 0 | 0.09 | 0.18 | 0.36 | 0.72 | 1 |
| Flame-retarding properties | | | | | | | |
| (according to UL-94, total extinction time, seconds) | | | | | | | |
| (10 ignitions, 5 test rods) | | | | | | | |
| (1.6 mm) | 94 | 96 | 106 | 77 | 42 | 20 | 20 |
| (3.2 mm) | 53 | 39 | 39 | 24 | 17 | 10 | 10 |
| UL-evaluation | V1 | V1 | V1 | V1 | V0 | V0 | V0 |
| Smoke density in Ds-units | | | | | | | |
| according to ASTM E-662 | | | | | | | |
| (1.5 min.) | 84 | 56 | 25 | 44 | 30 | 20 | 25 |
| (4.0 min.) | 337 | 230 | 284 | 244 | 162 | 87 | 120 |
| (10 min.) | 425 | 316 | 433 | 334 | 380 | 197 | 290 |

As appears from the above, PVDF itself has already a significant influence on the smoke production. The best combination as regards flame-retarding activity is that with 2% by weight of PVDF and 0.72% by weight of boron oxide.

EXAMPLE 2

The following flame-retardants and other additives were incorporated in a mixture of 85 parts by weight of PPE (=polyphenylene ether) and 15 parts by weight of Benzoflex S552 with the results recorded hereinafter.

| Flame retardant | UL 94, 1.6 mm total extinction time, sec |
|---|---|
| None | 82.5 |
| 2 parts by weight of PVDF + 0.25 parts by weight of $B_2O_3$ + 0.75 parts by weight of $LiBO_2$ | 45 |
| 2 parts by weight of polytetrafluoroethene (PTFE) + 1 part by weight of $B_2O_3$ | 25 |
| 2 parts by weight of PVDF + 1 part by weight of $B_2O_3$, 0.5 parts by weight of gas soot (pigment) and 1.5 parts by weight of polyoctenylene rubber (to improve the impact strength | 20 |
| 2 parts by weight of PFTE, 1 part by weight of $B_2O_3$ and 0.5 parts by weight of gas soot | 25 |

EXAMPLE 3

A comparative smoke density test was carried out with the following mixtures and the following results:

| | Parts by weight | | | | |
|---|---|---|---|---|---|
| PPE | 85 | 85 | 85 | 85 | 85 |
| Benzoflex | 15 | 15 | 15 | 15 | 15 |
| PVDF | — | 2 | — | 2 | — |
| PTFE | — | — | 2 | — | 2 |
| $B_2O_3$ | — | 0.72 | 1 | 1 | 1 |
| Gas soot | — | — | — | 0.5 | 0.5 |
| Polyoctenylene rubber | — | — | — | 1.5 | — |
| Smoke (1.5 min) | 100 | 20 | 25 | 10 | 25 |
| density, Ds (4 min.) | 370 | 90 | 140 | 60 | 140 |
| (10 min.) | 400 | 190 | 200 | 200 | 250 |

EXAMPLE 4

A number of tests were carried out again with the plasticizer pentaerytritol tetrabenzoate, abbreviated as PETB in the table below. In this table polyoctenylene rubber is abbreviated as PO.

| | | | | | | | | | | |
|---|---|---|---|---|---|---|---|---|---|---|
| PPE | 85 | 85 | 85 | 85 | 85 | 85 | 85 | 85 | 85 | 85 |
| PETB | 15 | 15 | 15 | 15 | 15 | 15 | 15 | 15 | 15 | 15 |
| PVDF | | | | | | | | | | |
| PTFE | | 1 | 2 | 3 | 5 | 7 | 2 | 2 | 3 | 3 | 2 |
| $B_2O_3$ | | 0.5 | 1 | 1.5 | 2.5 | 3.5 | 2 | 3 | 3 | 0 | 1 |
| PO | | | | | | | | | | |
| $LiBO_2$ | | | | | | | | | | |
| Gassoot | | | | | | | | | | 0.5 |
| UL-94 | | | | | | | | | | |
| 1.6 mm (sec) | 85 | 49 | ← | | <20 | → | | | 90 | <20 |
| Evaluation | VI | ← | | | V-0 | → | | | V-1 | V-0 |
| Smoke density | | | | | | | | | | |
| 1,5" | 100 | 40 | 25 | 16 | 12 | 14 | 11 | 10 | 14 | 110 | 25 |

-continued

|   |   |   |   |   |   |   |   |   |   |   |   |
|---|---|---|---|---|---|---|---|---|---|---|---|
| 4" | 370 | 187 | 140 | 92 | 60 | 60 | 79 | 90 | 71 | 385 | 140 |
| 10" | 400 | 300 | 200 | 160 | 95 | 107 | 145 | 130 | 109 | 410 | 300 |
| Char[a] (%) | 28 | 30 | 31 | 33 | 37 | 36 | 36 | 36 | 36 | 28 | 31 |

|   |   |   |   |   |   |   |   |   |   |   |
|---|---|---|---|---|---|---|---|---|---|---|
| PPE |  | 85 | 80 | 80 | 80 | 80 | 80 | 80 | 80 | 85 |
| PETB |  | 15 | 20 | 20 | 20 | 20 | 20 | 20 | 20 | 15 |
| PVDF |  | 2 |  | 0.5 | 0.25 | 0.5 | 1 | 2 | 1 | 2 |
| PTFE |  |  |  |  |  |  |  |  |  |  |
| $B_2O_3$ |  | 1 |  |  | 0.09 | 0.18 | 0.36 | 0.72 | 0.25 |  |
| PO |  | 1.5 |  |  |  |  |  |  |  |  |
| $LiBO_2$ |  |  |  |  |  |  |  |  |  | 0.75 |
| Gassoot |  | 0.5 |  |  |  |  |  |  |  |  |
| UL-94 |  |  |  |  |  |  |  |  |  |  |
| 1.6 mm (sec) |  | <20 | 94 | 96 | 106 | 77 | 42 | <20 | <20 | 45 |
| Evaluation |  | V-0 | V-1 | V-1 | V-1 | V-1 | V-0 | V-0 | V-0 | V-0 |
| Smoke density |  |  |  |  |  |  |  |  |  |  |
| 1.5" |  | 10 | 84 | 56 | 25 | 44 | 30 | 20 | 25 | 20 |
| 4" |  | 60 | 377 | 230 | 284 | 244 | 162 | 87 | 120 | 110 |
| 10" |  | 200 | 425 | 316 | 433 | 334 | 380 | 197 | 290 | 230 |
| Char[a] (%) |  | 37 | 28 | 28 | 29 | 30 | 32 | 37 | 36 | 36 |

[a] Residual weight in thermogravimetric analysis (determined at 600° C., under nitrogen, heating rate 200° C./min.).

As will be apparent from the above table, very good results were obtained in the tests with polytetrafluoroethene in combination with $B_2O_3$ or borate which was also the case with a number of combinations with polyvinylidene fluoride In the last-mentioned combinations slightly smaller quantities of the two components sufficed.

EXAMPLE 5

The example below indicates that the combination of the invention also leads to better results in the so-called Char test in the case of combinations of PPE and high-impact polystyrene, abbreviated as HIPS in the table below. For comparison, tests are also recorded with the HIPS as the only polymeric component.

|   | Parts by weight |   |   |   |   |   |   |
|---|---|---|---|---|---|---|---|
| PPE | 50 | 50 | 30 | 30 | 0 | 0 | 0 |
| HIPS | 50 | 50 | 70 | 70 | 100 | 100 | 100 |
| PVDF |  | 2 |  | 2 |  | 2 | 5 |
| $B_2O_3$ |  | 2 |  | 2 |  | 2 | 5 |
| Char (%) | 18 | 30 | 8 | 23 | 0 | 1 | 3 |

It appears from the table that the present flame-retarding combination showed a significant effect even with a combination of PPE and HIPS consisting predominantly of HIPS, while this was not the case with the HIPS as the only polymeric component. The effect of the flame-retarding combination hence proves to be coupled with the presence of a certain minimum content of PPE in the polymeric component; this minimum is approximately 20%.

EXAMPLE 6

A flame-retardant combination of PTFE and $H_3BO_3$ was used. The tested mixture had the following composition:

|   | Parts by weight |
|---|---|
| PPE | 85 |
| PETB | 15 |
| PTFE | 1.5 |

-continued

|   | Parts by weight |
|---|---|
| $H_3BO_3$ | 2.2 |
| PO | 5 |
| Gas soot | 0.5 |

With this mixture the following results were obtained:

|   |   |   |
|---|---|---|
| UL-94, 1.6 mm, evaluation |  | V0 |
| Smoke density | after 1.5 min. | 16 |
|  | after 4.0 min. | 48 |
|  | after 10 min. | 197 |
| % Char (see example 5) |  | 36 |

The advantage of the combination PTFE and boric acid is that, due to the fine distribution of the latter, smaller quantities of this combination will suffice than in the case of the other PTFE combinations.

EXAMPLE 7

The following two mixtures:

|   | A | B |
|---|---|---|
| PPE | 80 | 80 |
| Benzoflex S552 | 20 | 20 |
| PVDF | 0 | 2 |
| Boron oxide | 0 | 0.7 | were mixed with glass fibres in the weight ratio 70 : 30. In the UL-94 test (2.5mm) the mixture of A and glass fibres was found to be very combustible, while the mixture of B and glass fibres obtained the evaluation VO. It was found that the smoke production in the 70 : 30 mixture of material B and glass fibres had deceased by more than 50% with respect to that of the 70 : 30 mixture of A and glass fibres.

EXAMPLE 8

A great number of tests were carried out with a number of PPE combinations and with various boron compounds and fluorine compounds

| Series A: | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| PPE | 85 | 85 | 85 | 85 | 85 | 85 | 85 | 85 | 85 | 60 | 85 | 85 | 85 | 85 | 100 | 100 | 100 |

-continued

| | | | | | | | | | | | | | | | | | |
|---|---|---|---|---|---|---|---|---|---|---|---|---|---|---|---|---|---|
| PETB | 15 | 15 | 15 | 15 | 15 | 15 | 15 | 15 | 15 | 40 | 15 | 15 | 15 | 15 | — | — | — |
| Polyoctenylene | 5 | 5 | 5 | 5 | 5 | 5 | 5 | 5 | — | 7 | 5 | 5 | 5 | 5 | — | — | — |
| Boronoxide | — | 2 | — | — | — | 1 | — | — | — | — | — | 2 | — | — | — | — | — |
| Boric acid | 2 | — | — | — | 2 | — | 1 | 1 | 0.5 | 2 | — | — | — | 2 | 2 | 2 | 2 |
| PTFE | — | 4 | — | 4 | 4 | 1 | 1 | 0.5 | 0.3 | 2 | — | — | — | — | — | — | 4 |
| CaF$_2$ | — | — | — | — | — | — | — | — | — | — | 4 | 4 | — | — | 4 | — | — |
| Potassiumperfluorobutane sulphonate | — | — | — | — | — | — | — | — | — | — | — | — | 4 | 4 | — | 4 | — |
| UL-94 evaluation 1.6 mm | V1 | V0 | V1 | V1 | V0 | V1 | V0 | V1 | V1 | V0 | V1 | V1 | V1 | V0 | V0 | V0 | V0 |
| Smoke density in Ds-units ASTM E662 | | | | | | | | | | | | | | | | | |
| 4 min. | 370 | 77 | 390 | 365 | 56 | 150 | 79 | 89 | 86 | 60 | 390 | 124 | 360 | 80 | 95 | 97 | 60 |
| 8 min. | 450 | 110 | 440 | 410 | 89 | 190 | 120 | 140 | 145 | 83 | 405 | 156 | 398 | 110 | 99 | 115 | 76 |

| Series B Experiment | 18 | 19 | 20 | 21 | 22 | 23 | 24 | 25 | 26 | 27 |
|---|---|---|---|---|---|---|---|---|---|---|
| PPE | 30 | 30 | 30 | 30 | 30 | 30 | 30 | 30 | 30 | 30 |
| HIPS | 70 | 70 | 70 | 70 | 70 | 70 | 70 | 70 | 70 | 70 |
| Isopropylated triphenyl phosphate (Reofos 50) | 10 | 10 | 10 | 10 | 10 | 10 | 10 | — | — | — |
| Tetraphenyl 1.3-phenylenedisphosphate | — | — | — | — | — | — | — | 10 | 10 | 10 |
| PTFE (fibre-forming) | 0.1 | 0.2 | 0.5 | — | — | — | — | 0.1 | 0.5 | — |
| PTFE (non-fibre-forming) | — | — | — | — | 0.5 | — | 0.5 | — | — | 0.5 |
| Boric acid | — | — | — | — | — | 0.7 | 0.7 | — | — | 0.7 |
| UL-94 evaluation 1.6 mm | BD | BD | BD | V1 | BD | BD | V1 | BD | V1 | V1 |
| Appearance of surface (S = splay, i.e. stripe formation on surface, OK = normal) | OK | OK | S | S | OK | OK | OK | OK | S | OK |

In the UL-94 test "BD" means that the material burns and drips.

The following is to be remarked with respect to this test series. In spite of the low content of PPE the V1-evaluation in the UL-94 test is reached with the combinations of the invention. In addition, a conventional flame-retardant of the phosphate type is also present. Herewith the combinations of the invention moreover provide an anti-drip effect, i.e. the materials do not drip when burning In the technique it is known to add fibre-forming PTFE for this purpose. However, the disadvantage of this is that surface problems, in particular so-called splay, are encountered with too high concentration. However, the anti-drip effect is obtained as well with the combination according to the invention, with non-fibre-forming PTFE, so that no surface problems occur.

| Series C: Test | 28 | 29 | 30 | 31 | 32 | 33 | 34 | 35 | 36 |
|---|---|---|---|---|---|---|---|---|---|
| PPE | 85 | 85 | 85 | 85 | 96 | 85 | 85 | 97 | 85 |
| PETB | 15 | 15 | 15 | 15 | — | 15 | 15 | — | 15 |
| Polyoctenylene | 5 | 5 | 5 | — | — | 5 | — | — | 5 |
| Boric acid | — | 2 | 2 | 2 | 2 | 2 | 2 | 2 | 2 |
| PTFE | — | 1.5 | — | — | — | — | — | — | — |
| NaBF$_4$ | — | — | 2 | 2 | 2 | — | — | — | — |
| KPF$_6$ | — | — | — | — | — | 1 | 1 | 1 | — |
| KZrF$_6$ | — | — | — | — | — | — | — | — | 2 |
| UL-94 evaluation | V1 | V0 | V0 | V0 | V0 | V0 | V0 | V0 | V0 |
| Smoke density in Ds-units, ASTM E662 | | | | | | | | | |
| 4 min. | 366 | 58 | 37 | 30 | 34 | 36 | 30 | 38 | 87 |
| 8 min. | 440 | 89 | 72 | 76 | 83 | 78 | 72 | 81 | 100 |

Series D

In this series a few special boroncontaining products were used the syntheses of which are given hereinafter.

A. Tribenzyl borate

A mixture of 186g of boric acid and 990g of benzyl alcohol was heated at 70° C. During the reaction 180ml of a water/benzyl alcohol azeotrope were distilled over. The residue was distilled under a pressure of 0.5-10mm Hg and in this manner 950g of the title compound were obtained as a clear liquid.

B. Oligo (benzyl-bisphenol-A-borate) having a low Tg-value.

34g Of bisphenol-A and 100g of tribenzyl borate were stirred under a pressure of 0.5-10mm Hg at a temperature of 120° C. During the reaction benzyl alcohol (28g) was distilled over. The residue was a clear viscous liquid. The compound has a Tg-value below 0° C.

C. Poly (benzyl-bisphenol-A-borate) having a high Tg-Value

The synthesis was carried out in the same manner as for the product having a low Tg. 100g of tribenzyl borate and 68g of bisphenol-A were used. The residue is poured out after distillation at a temperature of 300° C. After cooling the resulting solid was pulverised. In representative cases the Tg is above 100° C.

The compounds described were incorporated in PPE by dry-mixing, succeeded by extrusion, according to the method used for introducing all the other constituents.

| Series D Experiment | 37 | 38 | 39 | 40 | 41 | 42 | 43 | 44 |
|---|---|---|---|---|---|---|---|---|
| PPE | 79 | 79 | 79 | 79 | 79 | 79 | 79 | 79 |
| PETB | 13 | 13 | 13 | 13 | 13 | 13 | 13 | 13 |
| Polyoctenylene | 5 | 5 | 5 | 5 | 5 | 5 | 5 | 5 |
| Boric acid | 2 | — | — | — | — | — | — | — |
| PTFE | 1.4 | — | 1.4 | — | 1.4 | — | 1.4 | — |
| Tribenzyl borate | — | 5 | 5 | — | — | — | — | — |
| Oligo(benzyl-BPA-boraat) | — | — | — | 5 | 5 | — | — | — |
| Poly(benzyl-BPA-boraat) | — | — | — | — | — | 5 | 5 | 5 |
| CaF$_2$ | — | — | — | — | — | — | — | 1.4 |
| UL-94 evaluation (1.6 mm) | V0 | V2 | V0 | V2 | V0 | V2 | V0 | V0 |
| Smoke density in Ds-units ASTM E662 | | | | | | | | |
| 4 min. | 64 | 320 | 37 | 299 | 56 | 324 | 46 | 77 |
| 8 min. | 107 | 433 | 142 | 412 | 167 | 411 | 145 | 166 |
| HDT (deformation temperature) (°C.) | 150 | 131 | 131 | 132 | 132 | 135 | 135 | 135 |

| Series E Experiment | 45 | 46 | 47 | 48 | 49 | 50 | 51 | 52 |
|---|---|---|---|---|---|---|---|---|
| PPE | 92 | 85 | 87 | 82 | 72 | 82 | 82 | 82 |
| Polyoctenylene | 5 | 5 | 5 | 5 | 5 | 5 | 5 | 5 |
| Boric acid | 2 | 2 | 2 | 2 | 2 | 2 | 2 | 2 |
| PTFE | 1.4 | 1.4 | 1.4 | 1.4 | 1.4 | 1.4 | 1.4 | 1.4 |
| PETB | — | 15 | — | — | — | — | — | — |
| Polystyrene | — | — | 5 | 10 | 20 | — | — | — |
| Diphenyl sulphone | — | — | — | — | — | 10 | — | — |
| Minerall oil (Flexon, Exxon) | — | — | — | — | — | — | 10 | — |
| Indene resin (plasticiser) (Hercures A150, Hercules) | — | — | — | — | — | — | — | 10 |
| HDT (°C.) | 196 | 147 | 190 | 185 | 176 | 157 | 155 | 158 |
| UL-94 evaluation 1.6 mm | V0 | V0 | V0 | V1 | V2 | burns | burns | burns |
| Smoke density in Ds-Units ASTM E662 | | | | | | | | |
| 4 min. | 55 | 65 | 59 | 75 | 80 | — | — | — |
| 8 min. | 89 | 90 | 110 | 110 | 210 | — | — | — |

Remarks:
The organoborates are slightly less active smoke suppressors than boric acid, but in this connection it should be considered that, as far as the boron content is concerned, 5 parts of organoborate correspond to 1 part of boric acid.
The organoborates have the further advantage that they can also serve as plasticisers, as appears from the HDT values.

The following are examples with other basic polymers.

able were used, namely the product DLX6000 and the product Polymist F-5A. Both products form particles.

| Experiment | 1 | 2 | 3 | 4 | 5 | 6 | 7 | 8 | 9 | 10 | 11 |
|---|---|---|---|---|---|---|---|---|---|---|---|
| Polycarbonate | 100 | 99 | 98 | 97 | 98 | 97 | 97.5 | 95 | 92.5 | 95 | 92.5 |
| DLX6000 | — | — | 2 | 2 | — | — | — | 5 | 5 | — | — |
| Polymist F-5A | — | — | — | — | 2 | 2 | — | — | — | 5 | 5 |
| Boron oxide | — | 1 | — | 1 | — | 1 | 2.5 | — | 2.5 | — | 2.5 |
| UL-94 (1.6 mm) | BD | BD | BD | V1 | BD | V1 | BD | BD | V1 | BD | V1 |
| Average extinction time (sec.) | — | — | — | 8 | — | 8 | — | — | 6 | — | 5 |

BD means: burns and drips

EXAMPLE 9

In this example a polycarbonate was used derived from bisphenol-A and having a viscosity of 52.5 ml/g in methylene chloride at 25° C. In the test series hereinafter 2 types of polytetrafluoroethene commercially avail-

EXAMPLE 10

Mixtures of polycarbonate and styrene-maleic acid anhydride copolymer are difficult to make flame-retardant. This proves to be very well possible with the system of the invention, as appears from the experiments below.

| | Comparative experiments | | | | Experiments according to the invention | |
|---|---|---|---|---|---|---|
| | A | B | C | D | 5 | 6 |
| Bisphenol A-polycarbonate (see example 9) | 66.75 | 54.75 | 54.75 | 56.75 | 66.55 | 45.75 |
| Copolycarbonate of Bisphenol-A and tetrabromo Bisphenol-A (50/50 ratio) | 8 | 20 | 15 | 15 | — | 15 |
| Sodiumtrichlonobenzenesulphonate | 0.5 | 0.5 | 0.5 | 0.5 | — | — |
| Fibrous polytetrafluoroethene | 0.25 | 0.25 | 0.25 | 0.25 | 0.25 | 0.25 |

-continued

|  | Comparative experiments | | | | Experiments according to the invention | |
|---|---|---|---|---|---|---|
|  | A | B | C | D | 5 | 6 |
| Polymist | — | — | — | — | 0.5 | 1 |
| B2O3 | — | — | — | — | 0.2 | 0.5 |
| Sb2O3 | 2 | 2 | 2 | 2 | — | — |
| SMA[1] | 15 | 15 | 15 | 15 | 15 | 15 |
| Radial teleblockpolymeer (rubber) | 7.5 | 7.5 | 7.5 | 7.5 | 7.5 | 7.5 |
| MBS[2] | — | — | — | — | — | 5 |
| Tetraphenyl resorcinol diphosphate | — | — | 5 | 5 | 10 | 10 |
| Izod-notch impact value, J/m | 520 | 480 | 370 | 270 | 470 | 450 |
| UL-evaluation, 1.6 mm | V2 | V0 | V2 | V2 | V0 | V0 |

[1]Rubber-modified styrene-maleic anhydride copolymer
[2]Graft copolymer of methyl methacrylate, butadiene and styrene to improve the impact strength.

It is to be noted that in the comparative examples the sodium trichlorobenzene sulphonate is used as a component of the flame-retardant combination. As appears from the table the result VO is obtained in the comparative experiments only with a large quantity of copolycarbonate in combination with the said sulphonate and $Sb_2O_3$.

EXAMPLE 11

Experiments were carried out with polyphenylene sulphide (PPS) and mixtures thereof with polyphenylene ether (PPE).

| Experiment | 1 | 2 | 3 | 4 |
|---|---|---|---|---|
| PPS | 100 | 100 | 50 | 50 |
| PPE | — | — | 50 | 50 |
| Boric acid | — | 2.2 | — | 2.2 |
| Polytetrafluoroethene | — | 1.5 | — | 1.5 |
| Smoke density in Ds-units, ASTM E-662 after 4 min. | 12 | 8 | 24 | 12 |

EXAMPLE 12

Experiments were carried out with aromatic polyether sulphone, a polymer of units of the formula $-C_6H_4-O-C_6H_4SO_2-$. The mixtures and the results are recorded in the table hereinafter.

| Experiment | 1 | 2 | 3 | 4 | 5 |
|---|---|---|---|---|---|
| Polyether sulphone | 100 | 99 | 99.3 | 99.8 | 96.3 |
| Boric acid | — | 1 | — | 1 | 2.2 |
| Polytetrafluoroethene | — | — | 0.7 | 0.7 | 1.5 |
| Smoke density in Ds-units, ASTM E-662 | | | | | |
| 4 min. | 1 | 1 | 1 | 0 | 0 |
| 8 min. | 3 | 3 | 4 | 1 | 1 |
| Maximum | 5 | 6 | 5 | 3 | 2 |

In this case the interesting result is thus obtained that even with a polymer which in itself produces little smoke upon burning, the said smoke production can even be further reduced by the combination of the present invention.

EXAMPLE 13

Experiments were carried out with aromatic polyetherimide which in itself is not very combustible. It was found that the combination of the invention provides a surprising further reduction of the extinction time in the UL-94 test and of the smoke production, as will be apparent from the experiments below.

As polyetherimides were used for these experiments the commercial products ULTEM® 1100 and ULTEM® 1000.

| Experiment | A | B | C | D | E | F |
|---|---|---|---|---|---|---|
| ULTEM® 1100 | 100 | 100 | 100 | — | — | — |
| ULTEM® 1000 | — | — | — | 100 | 100 | 100 |
| Boric acid | — | 0.5 | 1 | — | 0.5 | 1 |
| Polytetrafluoroethene (particles-forming) | — | 0.35 | 0.7 | — | 0.35 | 0.7 |
| UL-94 (1.6 mm), average extinction time, seconds | 1.5 | 0 | 0 | 1.6 | 0 | 0 |
| Max. smoke density according to ASTM E662, DS | 13 | 4 | 4 | 60 | 40 | 35 |

We claim:

1. A polymer composition, which comprises: a polyphenylene ether polymer wherein at least 20 percent of the polymer comprises an aromatic main chain; and as a flame-retardant ingredient, a mixture consisting essentially of 0.2-15 percent by weight of the fluroine containing polymer selected from the group consisting of polyvinylidene fluoride, polytetrafluoroethylene and copolymers of ethylene and tetrafluoroethylene and 0.05-10 percent by weight of an inorganic boron compound.

2. A polymer composition, which comprises; a polyphenylene sulfide polymer wherein at least 20 percent of the polymer comprises an aromatic main chain; and as a flame-retardant ingredient, a mixture consisting essentially of 0.02-15 percent by weight of a fluorine containing polymer selected from the group consisting of polyvinylidene fluoride, polytetrafluoroethylene and copolymers of ethylene and tetrafluoroethylene and 0.05-10 percent by weight of an inorganic boron compound.

3. A polymer composition, which comprises; a polyether sulfone polymer wherein at least 20 percent of the polymer comprises an aromatic main chain; and as a flame-retardant ingredient, a mixture consisting essentially of 0.2-15 percent by weight of a fluorine containing polymer selected from the group consisting of polyvinylidene fluoride, polytetrafluoroethylene and copolymers of ethylene and tetrafluorethylene and 0.05-10 percent by weight of an inorganic boron compound.

4. A polymer composition, which comprises;
a polyether imide polymer wherein at least 20 percent of the polymer comprises an aromatic main chain; and as a flame-retardant ingredient, a mixture consisting essentially of 0.2-15 percent by weight of a fluorine containing polymer selected from the group consisting of polyvinylidene fluoride, polytetrafluoroethylene and copolymers of ethylene and tetrafluoroethylene and 0.05-10 percent by weight of an inorganic boron compound.

5. A polymer composition, which comprises:
a polyphenylene sulfide polymer wherein at least 20 percent of the polymer comprises an aromatic main chain; and as a flame-retardant ingredient, a mixture consisting essentially of 0.2-15 percent by weight of polytetrafluoroethylene and 0.05-10 percent by weight of boric acid.

6. A polymer composition, which comprises:
a polyether sulfone polymer wherein at least 20 percent of the polymer comprises an aromatic main chain; and as a flame-retardant ingredient, a mixture consisting essentially of 0.2-15 percent by weight of polytetrafluoroethylene and 0.05-10 percent by weight of boric acid.

7. A polymer composition, which comprises:
a polyetherimide polymer wherein at least 20 percent of the polymer comprises an aromatic main chain; and as a flame-retardant ingredient, a mixture consisting essentially of 0.2-15 percent by weight of polytetrafluoroethylene and 0.05-10 percent by weight of boric acid.

8. A polymer composition, which comprises:
a polyphenylene ether polymer wherein at least 20 percent of the polymer comprises an aromatic main chain; and as a flame retardant ingredient, a mixture consisting essentially of 3 to 7 percent by weight of the polymer of a polytetrafluoroethylene and 1.5 and 3.5 percent by weight of a boron compound selected from the group consisting of $B_2O_3$ and a borate.

9. A polymer composition, which comprises;
a polyphenylene ether polymer wherein at least 20 percent of the polymer comprises an aromatic main chain; and as a flame retardant ingredient, a mixture of 1 to 2 percent by weight of polymer of polytetrafluoroethylene and 1 to 3 percent by weight of boric acid.

10. A polymer composition, which comprises:
a polyphenylene ether polymer wherein at least 20 percent of the polymer comprises an aromatic main chain; and as a flame retarding ingredient, a mixture consisting essentially of 0.2 to 15.0 percent by weight of the polymer of polyvinylidene fluoride and 0.2 to 3 percent by weight of an inorganic boron compound selected from the group consisting of boric acid, $B_2O_3$ and borate.

* * * * *